US006940889B2

(12) United States Patent
Eggleton et al.

(10) Patent No.: US 6,940,889 B2
(45) Date of Patent: Sep. 6, 2005

(54) OPTICAL PULSE SOURCE FOR LONG HAUL OPTICAL COMMUNICATION SYSTEMS

(75) Inventors: Benjamin John Eggleton, Summit, NJ (US); Daniel Mahgerefteh, Los Angeles, CA (US); Paul Steinvurzel, Jersey City, NJ (US); Paul Stephen Westbrook, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/084,788

(22) Filed: Feb. 26, 2002

(65) Prior Publication Data

US 2002/0131470 A1 Sep. 19, 2002

Related U.S. Application Data

(60) Provisional application No. 60/276,070, filed on Mar. 15, 2001.

(51) Int. Cl.[7] ............................................... H01S 3/08
(52) U.S. Cl. ........................... 372/102; 372/20; 372/32; 372/43; 372/6
(58) Field of Search ........................... 372/102, 20, 32, 372/43; 359/124; 385/37

(56) References Cited

U.S. PATENT DOCUMENTS

| 4,784,452 A |   | 11/1988 | Hodge et al. ............. 350/96.15 |
| 5,299,212 A | * | 3/1994  | Koch et al. ................... 372/32 |
| 5,416,629 A |   | 5/1995  | Huber ......................... 359/182 |
| 5,673,129 A | * | 9/1997  | Mizrahi ....................... 359/124 |
| 5,691,989 A | * | 11/1997 | Rakuljic et al. ............... 372/20 |
| 5,742,714 A |   | 4/1998  | Byron .......................... 385/27 |
| 5,875,273 A | * | 2/1999  | Mizrahi et al. ................ 385/37 |
| 5,943,152 A |   | 8/1999  | Mizrahi et al. .............. 359/187 |
| 6,115,403 A |   | 9/2000  | Brenner et al. .............. 372/102 |
| 6,282,340 B1 | * | 8/2001 | Nasu et al. .................... 385/37 |
| 6,611,645 B2 | * | 8/2003 | Aleksoff ....................... 385/48 |

FOREIGN PATENT DOCUMENTS

WO            WO98/09280         3/1998

OTHER PUBLICATIONS

Haggan, C.W., etal., "Narrow–band Rejection Filters with Negligible Backreflection Using Titled Photoinduced Gratings in Single–Mode Fibers", IEEE Photonics Technology Letters, IEEE Inc. New York, US, vol. 10, No. 5., May 1998, pp. 690–692.

* cited by examiner

*Primary Examiner*—Min Harvey
*Assistant Examiner*—Dung Michael T Nguyen

(57) ABSTRACT

In accordance with the invention, a modulated RZ pulse source comprises a modulated light source optically coupled to a stabilized Bragg grating filter and one or more optical taps. The light source is preferably modulated in power and frequency and has an adjustable channel wavelength $\lambda$. The Bragg grating filter has a reflectivity bandwidth having a high slope reflectivity cutoff and is preferably tunable. A feedback arrangement responsive to the taps keeps the source channel wavelength $\lambda$ on the edge of the reflectivity bandwidth for shaping RZ pulses. When the Bragg grating is stabilized, the feedback system maintains $\lambda$ at a value linked to the grating reflectivity edge and, by overlapping at least part of the optical spectrum of the source, converts the modulated source light into RZ pulses with high extinction ratio ($\geq 12$ dB). The result is a high power, jitter-free RZ pulse source that is compact, inexpensive and power efficient.

19 Claims, 2 Drawing Sheets

OPTICAL PULSE SOURCE FOR LONG HAUL OPTICAL COMMUNICATION SYSTEMS

CROSS REFERENCE TO RELATED APPLICATIONS

This application claims the benefit of U.S. Provisional Application Ser. No. 60/276,070 filed by the present inventors on Mar. 15, 2001 and entitled "Optical Device Comprising Filter Monitoring Means". The 276,070 application is incorporated herein by reference.

FIELD OF THE INVENTION

This invention relates to optical pulse sources and, in particular to a modulated, return-to-zero optical pulse source particularly useful in long haul optical communication systems.

BACKGROUND OF THE INVENTION

Return-to-zero pulse sources are important components in wavelength division multiplexed optical fiber communications systems (WDM systems and dense WDM systems). Return-to-zero optical pulses (RZ pulses) are optical pulses whose power level drops to substantially zero. WDM systems, transmit optical signal pulses in a plurality of different wavelength channels. Dense WDM systems (DWDM systems) transmit more channels. RZ pulses, which typically have pulse widths on the order of 50 picoseconds or less, are the preferred optical pulses for WDM and DWDM systems, especially for long haul (long distance) transmission. Especially preferred are RZ pulses such as solitons that maintain their pulse shape integrity over long fiber lengths. As a consequence of their short duration and resistance to dispersion, solitons have been chosen as the preferred signal pulses for contemplated high speed (10 Gb/s and 40 Gb/s) long haul systems. Such systems will require inexpensive, compact, high power, jitter-free sources of soliton pulses.

While several RZ pulse sources exist, they all have technical drawbacks for these contemplated systems. Distributed feedback (DFB) lasers typically provide the optical power for generating soliton pulses. Gain-switched and filtered DFB lasers suffer from timing jitter, which limits transmission distance (Mollenauer, et al., *Electronics Letters* 27, 178–179(1991)). Mode-locked external cavity lasers require mechanical stability and have a repetition rate that is determined by the cavity length (Morton, et al., *Institute of Electronics and Electrical Engineers (IEEE) Photonics Technology Letters*, 5, 28–31 (1993)). Discrete electroabsorption (EA) modulators can carve out pulses from a CW signal, but they have a high 8–10 dB loss. An integrated laser/electroabsorption pulse source is potentially a viable solution. However, optical power, electrical bandwidth, and high contrast ratio remain challenges.

Present 10 Gb/s electroabsorbtive modulated lasers (EMLs), used for short-haul non return-to-zero (NRZ) transmission, are limited to −2 dBm to 0 dBm output power and have bandwidths of 11 GHz. Furthermore, output power has to be sacrificed for higher contrast ratio; the electroabsorption section has to be biased into the highly absorptive spectral region to achieve high contrast ratio.

At 10 GHz, the pulse source is typically a CW laser followed by a $LiNbO_3$ modulator that is sinusoidally driven with high-power clock (>27 dBm). The main drawbacks of this combination are high loss of the modulator, large size, and high power consumption. The $LiNbO_3$ modulator has ~5–6 dB of coupling loss in addition to the 3–5 dB loss suffered by the production of pulses from a CW signal. Because the modulator's large $V_\pi$ requires an ~7 $V_{pp}$ voltage swing it has a high power consumption. In addition, all of the above sources require a wavelength locker to achieve the wavelength stability demanded by DWDM systems. A discrete wavelength locker adds to the size, while integrated wavelength lockers add additional complication. Accordingly, there is a need for an improved soliton pulse source.

SUMMARY OF THE INVENTION

In accordance with the invention, a modulated RZ pulse source comprises a modulated light source optically coupled to a stabilized Bragg grating filter and one or more optical taps. The light source is preferably modulated in power and frequency and has an adjustable channel wavelength $\lambda$. The Bragg grating filter has a reflectivity bandwidth having a high slope reflectivity cutoff and is preferably tunable. A feedback arrangement responsive to the taps keeps the source channel wavelength $\lambda$ on the edge of the reflectivity bandwidth for shaping RZ pulses. When the Bragg grating is stabilized, the feedback system maintains $\lambda$ at a value linked to the grating reflectivity edge and, by overlapping at least part of the optical spectrum of the source, converts the modulated source light into RZ pulses with high extinction ratio ($\geq 12$ dB). The result is a high power, jitter-free RZ pulse source that is compact, inexpensive and power efficient.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DESCRIPTION

An optical pulse source for generating RZ pulses at a wavelength $\lambda$ comprises an adjustable wavelength light source for generating pulses of light over a range including $\lambda$. Optically coupled to the light source is a stabilized Bragg grating filter having at $\lambda$ a high slope reflectivity cutoff response ($\geq 50$ dB/nm). One or more optical taps coupled to the light source and the Bragg grating tap signals representative of the light supplied to the grating and the light reflected or transmitted by the grating. A feedback circuit responsive to the tapped signals derives a control signal for adjusting the wavelength of the light source to $\lambda$. We will refer to such pulse sources as directly modulated RZ pulse sources (DMPS).

In advantageous embodiments of DMPS described below, the light source comprises a distributed feedback laser that can be modulated in power and frequency and that has an adjustable channel wavelength λ. The source is advantageously coupled to the Bragg grating by polarization maintaining fiber (PM fiber). And, a preferred Bragg grating is a temperature stabilized Bragg grating disposed in a controlled temperature environment. Control of the temperature can also tune the grating. The wavelength of the laser can be tuned by temperature adjustment and controlled by the feedback circuit.

Figure 1:
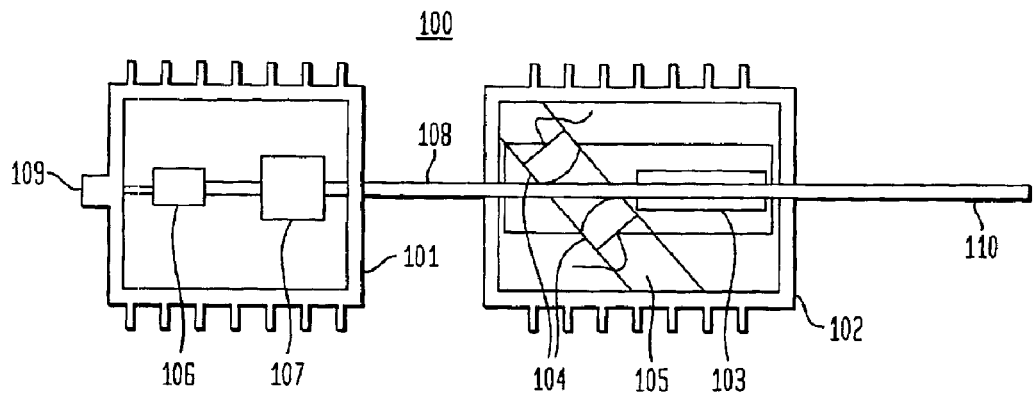
FIG. 1 is a block diagram of the directly modulated RZ pulse source (DMPS)

FIG. 1 shows an exemplary directly modulated RZ pulse source (DMPS) 100. The pulse source 100 comprises a directly modulated 1550 nm DFB laser 101 composed of chip 106 and isolator 107, coupled by a polarizing maintaining (PM) fiber 108 to a fiber Bragg grating filter 103. Laser 101 is biased high above threshold and is modulated with a clock signal at 10 GHz connected to the DFB laser at input 109 to produce an intensity modulated signal with a contrast ratio of 3 at optical output 110. Pulses are generated when the Bragg grating filter 103 filters out the high frequency edge of the modulated signal.

Directional tap 105, picks out the light incident on the filter grating 103 and the light reflected from the filter grating and directs it to the two detectors 104 placed on either side of the fiber 108. Useful taps include a fused fiber PM coupler (not shown) or a tilted grating tap 105. The tilted grating tap is more compact than a PM coupler. Directional tap 105, filter grating 103, detectors 104, and fiber 108 are housed as shown (FIGS. 1 and 2) in package 102.

Figure 2:
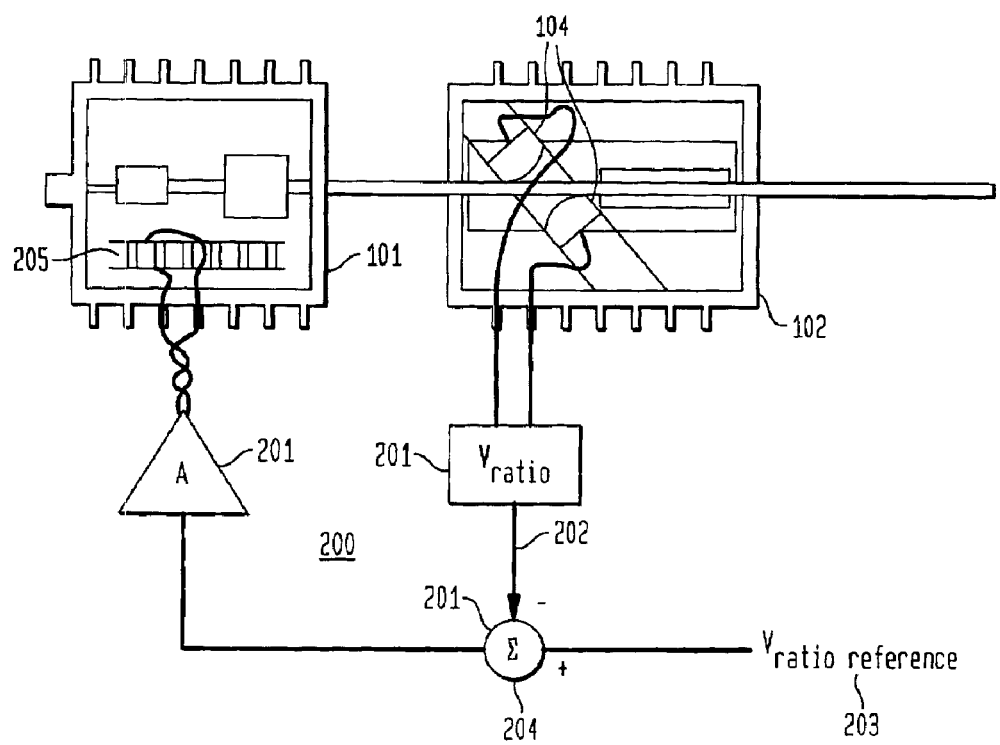
FIG. 2 is a DMPS as shown in FIG. 1, illustrating feedback of the ratio of the forward and reflected signals from the stabilized Bragg filter to control the DFB laser temperature.

An electronic feedback circuit 200, as shown in FIG. 2 (electronics shown in block form 201), by controlling the laser 101 temperature, via temperature control element 205, locks the laser wavelength to the filter edge. It can do this by keeping the ratio 202 of the two detected signals 104 at a constant level 203.

In the preferred embodiment, in order for the fiber grating filter to provide a wavelength reference, the grating filter is temperature stabilized. This can be achieved with a (thermoelectric) TE cooler, but a more compact solution involves the use of a tunable fiber grating filter. This aspect of thermal control is distinguished from the temperature control of the DFB laser. A temperature tunable PM fiber Bragg grating can be constructed with a thin metal film on-fiber heater. It produces similar pulse characteristics to those obtained with a standard fiber grating filter. The wavelength can be tuned over ~1.3 nm with a maximum power consumption of 0.5 W.

A tunable filter grating can be used for next generation transmitters which need to be tuned between adjacent DWDM channels. Temperature tunability can reduce the number of fiber grating codes required for supplying channels in the wavelength span. Such on-fiber heaters may also be used to stabilize the temperature, and therefore the wavelength of the grating resonance, thus replacing the TE cooler. An electronic control circuit using this method demonstrated a ±1 GHz wavelength stability by locking the laser wavelength to the edge of the fiber Bragg grating filter. The invention can now be understood more clearly by consideration of the following specific embodiment.

EXAMPLE

Figure 3:
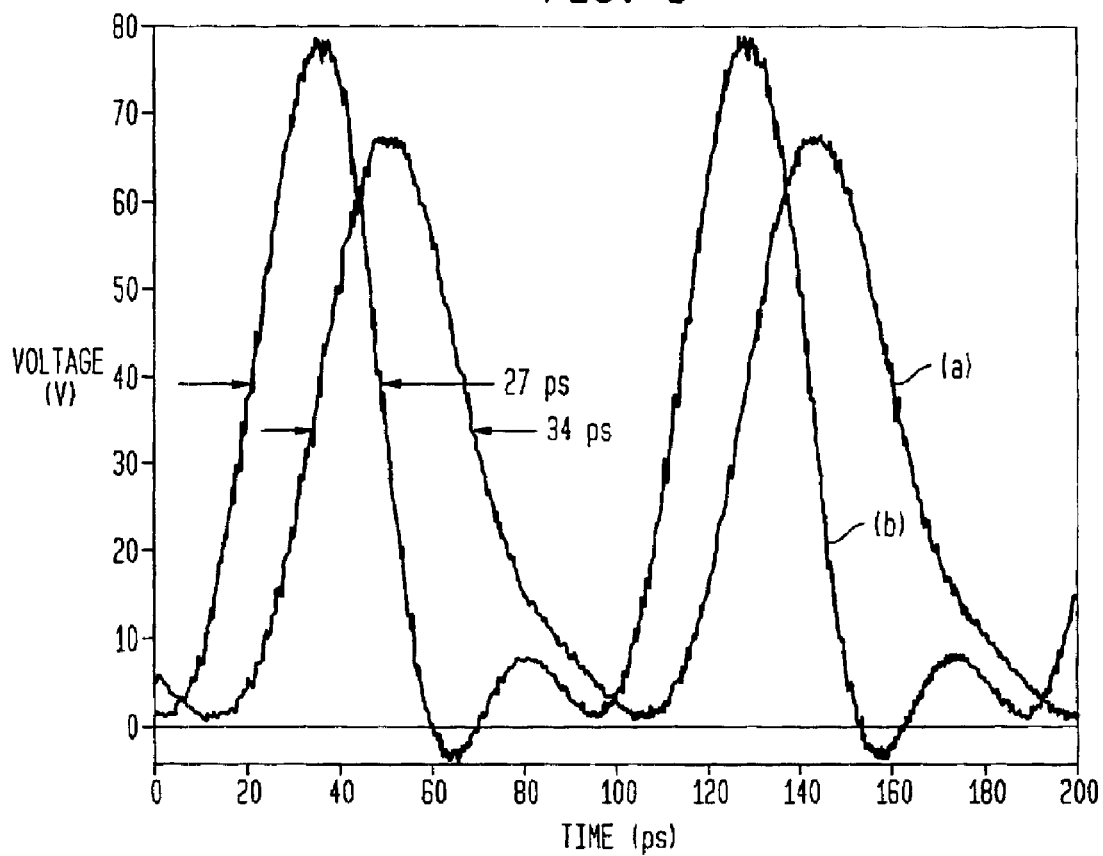
FIG. 3 illustrates two typical output pulses from a DMPS shown on a graph of Voltage vs. time; and, FIG. 4. illustrates the spectral response of a PM fiber grating Bragg filter for the fiber's fast axis, on a graph of Transmission vs. Wavelength.
Figure 4:
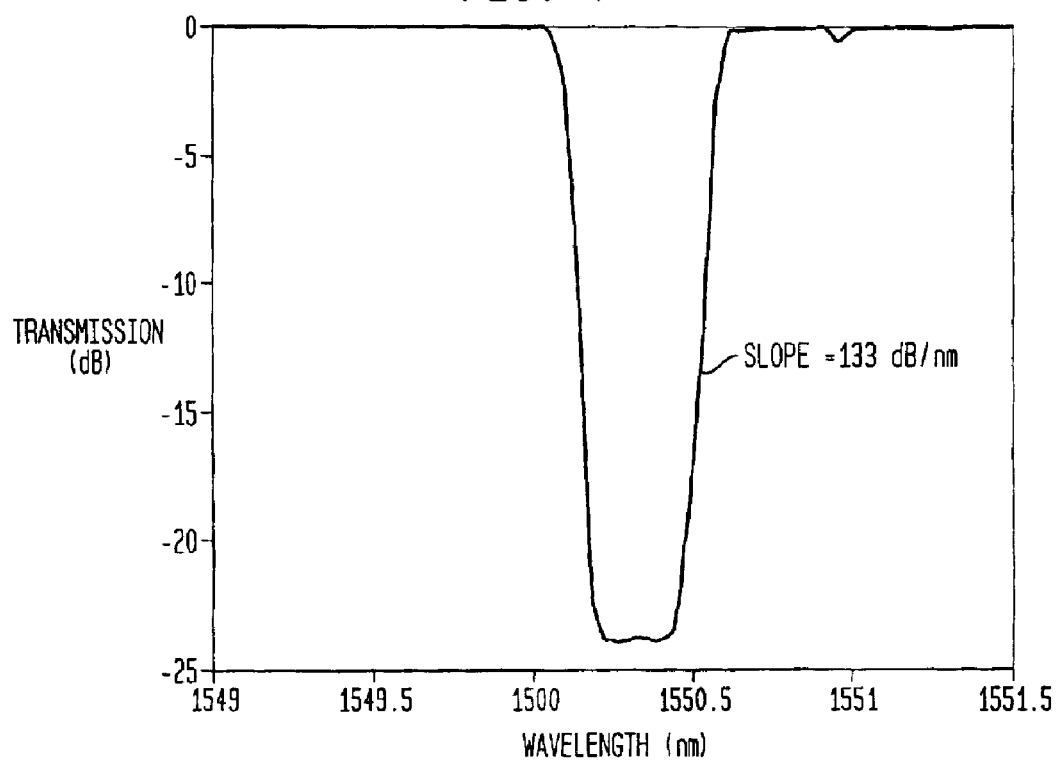

In the embodiment of FIG. 2, the grating tap was replaced by a 2×2 PM fiber coupler. A typical output pulse for the bench-top prototype is shown in FIG. 3. The laser was biased at 80 mA and modulated with ~15–18 dBm of RF power at 10.664 GHz. The laser wavelength was tuned to the long wavelength transmission edge of the grating, in order to remove some of the high frequency side bands of the modulated laser output and produce pulses. The pulse width can be tuned from 34 ps to 27 ps by increasing the RF power (FIG. 3, curve (a) and curve (b)). The laser wavelength had to be readjusted by 0.05 nm between cases (a) and (b). Curve (a) of FIG. 3, had a full width half maximum (FWHM) pulse width of 34 ps, a contrast ratio of 19.8 dB, and an output power of 6.8 dBm, RMS with a spectral width of 6.16 GHz. Curve (b) of FIG. 3, had a FWHM pulse width of 27.7 ps, a contrast ratio >15 dB (undetermined due to electronic ringing), an output power of 8.4 dBm, RMS and a pulse spectral width of 7.96 GHz. As shown in the graph of FIG. 4, the polarization maintaining fiber grating filter had a BW of 0.47 nm and a slope of ~133 dB/nm at the long wavelength transmission edge.

It is understood that the above-described embodiments are illustrative of only a few of the many possible specific embodiments, which can represent applications of the invention. Numerous and varied other arrangements can be made by those skilled in the art without departing from the spirit and scope of the invention.

We claim:

1. An optical pulse source to generate RZ pulses at a wavelength λ comprising:
    a modulated light source for generating optical pulses of light over an optical spectrum including λ, the source modulated in power and frequency;
    a Bragg grating having a filter response, the grating coupled to the light source and stabilized so that the filter response is over a range overlapping at least part of the optical spectrum of the source;
    a tilted grating tap coupled to the light source and the Bragg grating for tapping a signal representative of the light supplied to the grating and a signal representative of the light reflected or transmitted by the grating; and,
    a feedback circuit responsive to the tapped signals for adjusting the wavelength λ of the light source.

2. The optical pulse source of claim 1 wherein the feedback circuit adjusts the shape of pulses passing through the filter to produce RZ pulses.

3. The optical pulse source of claim 1 wherein the light source comprises a distributed feedback laser.

4. The optical pulse source of claim 1 wherein the Bragg grating is coupled to the source by polarization maintaining optical fiber.

5. The optical pulse source of claim 1 wherein the Bragg grating comprises a fiber Bragg grating stabilized by disposition in a controlled temperature environment.

6. The optical pulse source of claim 1 wherein the Bragg grating is tunable.

7. The optical pulse source of claim 1 wherein the light source comprises a temperature adjustable distributed feedback laser and the feedback circuit comprises an electronic circuit responsive to the taped signals for adjusting the temperature of the laser.

8. The optical pulse source of claim 1 wherein the Bragg grating comprises a PM (polarization maintaining) fiber.

9. The optical pulse source of claim 1 wherein a wavelength response curve represents the optical transfer function of the grating and the wavelength λ of the light source is locked to an edge of the grating wavelength response curve.

10. The optical pulse source of claim 1 wherein the Bragg grating and the titled grating tap are in a single package.

11. An optical pulse source to generate RZ pulses at a wavelength λ comprising:
    a modulated light source for generating optical pulses of light over an optical spectrum including λ, the source modulated in power and frequency;
    a Bragg grating having a filter response, the grating coupled to the light source and stabilized so that the filter response is over a range overlapping at least part of the optical spectrum of the source;

a fused fiber PM coupler coupled to the light source and the Bragg grating for tapping a signal representative of the light supplied to the grating and a signal representative of the light reflected or transmitted by the grating; and, a feedback circuit responsive to the tapped signals for adjusting the wavelength $\lambda$ of the light source.

12. The optical pulse source of claim 11 wherein the feedback circuit adjusts the shape of pulses passing through the filter to prodoce RZ pulses.

13. The optical pulse source of claim 11 wherein the light source comprises a distributed feedback laser.

14. The optical pulse source of claim 11 wherein the Bragg grating is coupled to the source by polarization maintaining optical fiber.

15. The optical pulse source of claim 11 wherein the Bragg grating comprises a fiber Bragg grating stabilized by disposition in a controlled temperature environment.

16. The optical pulse source of claim 11 wherein the Bragg grating is tunable.

17. The optical pulse source of claim 11 wherein the light source comprises a temperature adjustable distributed feedback laser and the feedback circuit comprises an electronic circuit responsive to the tapped signals for adjusting the temperature of the laser.

18. The optical pulse source of claim 11 wherein a wavelength response curve represents the optical transfer function of the grating and the wavelength $\lambda$ of the light source is locked to an edge of the grating wavelength response curve.

19. The optical pulse source of claim 11 wherein the Bragg grating and the fused fiber PM coupler are in a single package.

* * * * *